United States Patent [19]
Geck et al.

[11] Patent Number: 6,147,142
[45] Date of Patent: Nov. 14, 2000

[54] PREVIOUSLY CROSS-LINKED SILICONE ELASTOMER PARTICLES WITH AN ORGANOPOLYMER SHELL AS A CONSTITUENT FOR FORMULATING AQUEOUS COATING COMPOSITIONS

[75] Inventors: Michael Geck, Burghausen; Walter Goeblmeier, Wurmannsquick; Bernward Deubzer, Burghausen; Ekkehard Patrick, Burgkirchen; Helmut Oswaldbauer, Fuerstberg, all of Germany

[73] Assignee: Wacker-Chemie GmbH, Munich, Germany

[21] Appl. No.: 09/155,370
[22] PCT Filed: Apr. 24, 1997
[86] PCT No.: PCT/EP97/02093
§ 371 Date: Sep. 28, 1998
§ 102(e) Date: Sep. 28, 1998
[87] PCT Pub. No.: WO97/41183
PCT Pub. Date: Nov. 6, 1997

[30] Foreign Application Priority Data

Apr. 30, 1996 [DE] Germany .............. 196 17 379

[51] Int. Cl.$^7$ ............... C08L 83/04; C08F 8/00; C08F 283/12; C08G 77/04; C08G 77/38
[52] U.S. Cl. ............ 523/201; 525/100; 525/101; 525/106; 525/474; 525/479; 525/902; 524/837
[58] Field of Search ............ 524/837; 525/100, 525/101, 106, 474, 479, 902; 523/201

[56] References Cited

U.S. PATENT DOCUMENTS

| | | |
|---|---|---|
| 4,748,215 | 5/1988 | Lindner et al. . |
| 4,803,233 | 2/1989 | Narula et al. . |
| 5,202,368 | 4/1993 | Davies et al. . |
| 5,223,586 | 6/1993 | Maufner et al. . |
| 5,587,424 | 12/1996 | Langstein et al. . |
| 5,973,068 | 10/1999 | Yamaya et al. .......... 524/865 |
| 5,981,659 | 11/1999 | Geck et al. ............ 525/100 |

FOREIGN PATENT DOCUMENTS

| | | |
|---|---|---|
| 0217257 | 4/1987 | European Pat. Off. . |
| 0492376 | 7/1992 | European Pat. Off. . |
| 0541395 | 5/1993 | European Pat. Off. . |
| 0586048 | 3/1994 | European Pat. Off. . |
| 0630940 | 12/1994 | European Pat. Off. . |
| 1505881 | 12/1966 | France . |
| 2310213 | 9/1973 | Germany . |
| 3922285 | 1/1990 | Germany . |
| 2222167 | 2/1990 | United Kingdom . |
| 90/08810 | 8/1990 | WIPO . |
| 93/14169 | 7/1993 | WIPO . |

OTHER PUBLICATIONS

Derwent Abstract Corresp. to FR 1505881 A # 68–86404 P.
Derwent Abstract Corresp. to DE 2310213 A # 73–58541 U.

*Primary Examiner*—Robert Dawson
*Assistant Examiner*—Jeffrey B. Robertson
*Attorney, Agent, or Firm*—Brooks & Kushman P.C.

[57] ABSTRACT

Previously cross-linked silicone elastomer particles with an organic-polymer shell are used as constituents for formulating aqueous coating compositions based on water-soluble or water-dilutable binders. The silicone elastomer particles contain: (a) 5 to 95% by weight, with respect to the total weight of the copolymer, of a nuclear polymer of general formula $(R_2SiO_{2/2})_x(RSiO_{3/2})_y(SiO_{4/2})_z$, in which x=5 to 99.5% by mole, y=0.5 to 95% by mole, z=0 to 30% by mole, and (b) 5 to 95% by weight, with respect to the total weight of the copolymer of a shell made of an organopolymer from mono- or poly-ethylenically unsaturated monomers; and R stands for the same or different monovalent alkyl or alkenyl radicals with 1 to 6 carbon atoms, aryl radicals or substituted hydrocarbon radicals.

10 Claims, No Drawings

PREVIOUSLY CROSS-LINKED SILICONE ELASTOMER PARTICLES WITH AN ORGANOPOLYMER SHELL AS A CONSTITUENT FOR FORMULATING AQUEOUS COATING COMPOSITIONS

TECHNICAL FIELD

The invention relates to the use of precrosslinked silicone elastomer particles with an organic-polymer shell as a formulating constituent in aqueous coating compositions based on water-soluble or water-dilutable binders.

BACKGROUND ART

Aqueous coating materials comprise binders which are either soluble in or dilutable in water; the water-dilutable binders include resin components and resins which have been emulsified or rendered self-emulsifiable, and aqueous dispersions. Examples of water-soluble binders are modified alkyd resins, acrylate resins, linear and branched saturated polyester resins, epoxy resins, shellac and modified phenolic resins. Examples of water-dilutable binders are—optionally modified—dispersed or water-dispersible, unsaturated and saturated polyester resins, alkyd resin emulsions, polyurethane dispersions, one-component epoxy resin emulsions, emulsifiable two-component epoxy resin systems, dispersible alkyd, phenolic, melamine and urea resins, (meth)acrylate dispersions, (meth)acrylate copolymer dispersions, polystyrene and styrene copolymer dispersions, poly(vinyl ether) dispersions, and polyvinyl chloride and polyvinylidene chloride dispersions.

In addition to water-soluble or water-dilutable binders, aqueous coating materials generally include pigments, fillers, water-soluble crosslinkers and crosslinking catalysts, and further additives such as, for example, levelling assistants, devolatilizing assistants and wetting agents.

These compositions are applied in aqueous form, for example to metallic substrates, mineral substrates, plastics, wood, paper or glass. Following application, the aqueous film dries to a solid coating film. Films which dry at ambient temperature (room temperature) after drying in air, are optionally subjected to thermal conditioning/post-drying at temperatures up to 100° C. For other types of aqueous coating material, even higher temperatures (120–220° C.) may be necessary for film formation, if the latter requires the chemical reaction (post-crosslinking) of two or more binder components.

The water-soluble and water-dilutable binders listed predominantly comprise thermoplastic or thermosetting polymers, which are generally hard but brittle. To improve the film properties, therefore, impact modification of the polymer systems is frequently necessary. Silicones are known as modifiers for thermoplastics and thermosets and are of particular interest since they not only increase the impact strength but also improve low-temperature flexibility, weathering stability, stability to fluctuating temperature stress and chemical resistance of thermoplastic or thermosetting organic-polymer systems. Generally disadvantageous, however, is the fundamental incompatibility of silicones with organic polymers. The incompatibility may induce flow defects in the course of use, while migration of the silicones gives rise to adhesion problems and problems associated with overcoatability.

In DE-A 3922285 (=GB-A 2222167) (Dow Corning, laid open on Jan. 25, 1990) the known incompatibility of siloxanes with organic polymers is exploited for decorative purposes; it describes a coating composition composed of polydiorganosiloxane and of an aqueous dispersion of a film-forming polymeric material, for obtaining a hammered surface effect. Polysiloxanes of this kind are not suitable for the impact modification of aqueous coating materials, since the polysiloxane is present in emulsified form as a liquid in the water phase rather than as discrete particles. In the amount which needs to be used for impact modification, these compounds are exuded from the coating film.

EP-A 586048 (Shin Etsu, published on Mar. 9, 1994) describes diol-functional silicone oils as additives to aqueous coating materials for lowering the surface tension and improving the substrate wettability; in this established utility, these siloxanes show better flow properties than polyether-modified silicone oils. Siloxanes of this kind, present in emulsified form, are unsuitable for impact modification. The document goes on to describe that in amounts employed of >5% by weight there is a decrease in the mechanical strength of the polymer film modified with these compounds.

WO-A 93/14169 (Crompton Garland Ltd., published on Jul. 22, 1993) describes a formulation of a crosslinkable aqueous phenolic resin emulsion and of a silicone resin emulsion. In the course of the crosslinking of the phenolic resin component there is chemical attachment of the silicone to the phenolic resin, as a result of which the silicone component becomes included in the phenolic resin matrix as a plasticizer. U.S. Pat No. 4,803,233 (Dow Corning, granted on Feb. 7, 1989) describes aqueous mixtures which comprise organic polymer, silicone resin and a combination of three different nonionic emulsifiers. Depending on the polymer system and silicone component, the addition of silicone resin brings about—in some cases only after thermal treatment of the homogeneous blends—improved tensile strength, adhesion and corrosion resistance of the coating materials.

An improvement in the impact strength coupled with retention of hardness is described neither in WO-A 93/14169 nor in U.S. Pat. No. 4,803,233. There is no controlled microphase separation therein, since the substances involved are not organic-polymer-compatible modifiers with a particulate structure.

EP-A 541395 (Takemoto, published on May 5, 1993) describes aqueous coating compositions for thermoplastic polyester films on the basis of aqueous emulsions of polysiloxane-polyvinyl graft copolymers. These aqueous binder systems improve surface properties of the polyester films, such as smoothness, release properties, and water- and oil-repellency properties. In this case the graft copolymers are not employed as modifiers for organic-polymer binders in aqueous coating materials but are used as an aqueous coating composition with which it is possible to obtain particular surface properties in the context of application to thermoplastic polymer films.

WO-A 90/08810 (ICI Australia Operations Proprietary Ltd., published on Aug. 9, 1990) describes aqueous coating compositions on the basis of silicone-containing polymers, so-called "multi-polymer" particles. The "multi-polymer particles" are prepared by polymerizing the monomers in a mixture with silicone polymer. In this case the silicone constituent must be added to the monomer/monomers prior to polymer preparation and cannot be added as a formulation constituent to (just any) aqueous binder systems. The silicone component in the water-dilutable binder systems that are obtained in this case enhances, for example, the UV stability of the coating materials; an improvement in the impact strength is not described. Again, there is no controlled microphase separation in this case, since the silicone components employed are liquids or resins which do not comprise organic-polymer-compatible modifiers with a particulate structure.

SUMMARY OF THE INVENTION

The object on which the invention was based was to provide modifiers for aqueous coating compositions based on organic-polymer binders, i.e. aqueous coating materials, which are highly compatible with the organic-polymer binder and with which it is possible to improve the impact strength of the films obtainable therewith while at the same time retaining the existing, desired polymer properties, such as hardness, dimensional stability and mechanical strength.

DETAILED DESCRIPTION OF THE INVENTION

The invention provides for the use of precrosslinked silicone elastomer particles with an organic-polymer shell as a formulating constituent in aqueous coating compositions based on water-soluble or water-dilutable binders, where the silicone elastomer particles comprise a) from 5 to 95% by weight, based on the overall weight of the copolymer, of a core polymer of the general formula $(R_2SiO_{2/2})_x \cdot (RSiO_{3/2})_y \cdot (SiO_{4/2})_z$ where x=from 5 to 99.5 mol %, y=from 0.5 to 95 mol %, z=from 0 to 30 mol %, and b) from 5 to 95% by weight, based on the overall weight of the copolymer, of a shell of an organic polymer of mono- or polyethylenically unsaturated monomers, and R denotes identical or different monovalent alkyl or alkenyl radicals having 1 to 6 C atoms, aryl radicals or substituted hydrocarbon radicals.

The invention additionally provides aqueous coating compositions based on water-soluble or water-dilutable binders which as a formulating constituent comprise precrosslinked silicone elastomer particles with an organic-polymer shell, where the silicone elastomer particles comprise a) from 5 to 95% by weight, based on the overall weight of the copolymer, of a core polymer of the general formula $(R_2SiO_{2/2})_x \cdot (RSiO_{3/2})_y \cdot (SiO_{4/2})_z$ where x=from 5 to 99.5 mol %, y=from 0.5 to 95 mol %, z=from 0 to 30 mol %, and b) from 5 to 95% by weight, based on the overall weight of the copolymer, of a shell of an organic polymer of mono- or polyethylenically unsaturated monomers, and R denotes identical or different monovalent alkyl or alkenyl radicals having 1 to 6 C atoms, aryl radicals or substituted hydrocarbon radicals.

The precrosslinked silicone elastomer particles with an organic-polymer shell which are employed as a formulating constituent, and processes for their preparation, are described in EP-A 492376 (U.S. Pat. No. 5,223,586). By precrosslinked silicone elastomer particles is meant in this case that these particles are crosslinked by way of the proportion of $(RSiO_{3/2})$ and $(SiO_{4/2})$ units.

The silicone elastomer particles with an organic-polymer shell preferably comprise a) from 20 to 80% by weight, based on the copolymer overall weight, of a core polymer $(R_2SiO_{2/2})_x \cdot (RSiO_{3/2})_y \cdot (SiO_{4/2})_z$ where x=from 50 to 99 mol %, y=from 1 to 50 mol %; z=from 0 to 20 mol %; and b) from 20 to 80% by weight, based on the copolymer overall weight, of a shell of an organic polymer of mono- or polyethylenically unsaturated monomers, where R has the abovementioned meaning.

The radicals R are preferably alkyl radicals, such as the methyl, ethyl, n-propyl, isopropyl, n-butyl, sec-butyl, amyl, hexyl radical; alkenyl radicals, such as the vinyl, allyl, butenyl and 1-hexenyl radical; aryl radicals, such as the phenyl radical; or substituted hydrocarbon radicals, such as halogenated hydrocarbon radicals, mercaptoalkyl radicals, cyanoalkyl radicals, aminoalkyl radicals, acyloxyalkyl radicals, hydroxyalkyl radicals.

Particularly preferred radicals are methyl, ethyl, propyl, phenyl, vinyl, allyl, 1-hexenyl, 3-methacryloxypropyl and 3-mercaptopropyl, where less than 30 mol % of the radicals in the siloxane polymer are vinyl groups, 3-methacryloxypropyl or 3-mercaptopropyl groups.

As monomers for the organic polymer component b) it is preferred to employ acrylic esters or methacrylic esters and also mono- and diesters of fumaric and maleic acid with aliphatic alcohols and diols having 1 to 10 C atoms, acrylamides and methacrylamides, acrylonitrile, styrene, p-meth-ylstyrene, o-methylstyrene, divinylbenzene, vinyl acetate, vinyl propionate, maleimide, vinyl chloride, mono- and divinyl ethers, ethylene, butadiene, isoprene and chloroprene. Particular preference is given to styrene and to acrylic esters and methacrylic esters of aliphatic alcohols having 1 to 4 C atoms, examples being methyl (meth) acrylate, butyl (meth)acrylate and glycidyl (meth)acrylate. Both homopolymers and copolymers of these monomers are suitable as the organic polymer component.

The finely divided graft copolymers preferably have an average particle diameter of from 10 to 300 nm, with particular preference from 30 to 150 nm. The particle sizes may vary within the abovementioned range; preferably, there is a monomodal particle size distribution with a polydispersity index of not more than $\sigma_2=0.2$.

The polysiloxane graft base is prepared according to the emulsion polymerization process by metering in the corresponding mixture of monomeric silanes of the type $R_aSi(OR')_{4-a}$, where a=0, 1 or 2, or, if desired, low molecular mass siloxanes of the general formula $(R_2SiO)_n$ where n=from 3 to 8, to an agitated emulsifier/water mixture. The radical R has the meanings already mentioned. R' stands for alkyl radicals having from 1 to 6 C atoms, aryl radicals or substituted hydrocarbon radicals; methyl, ethyl and propyl radical being preferred. The silane or the silane mixture or silane/siloxane mixture is added in metered form. The emulsion polymerization is carried out at a temperature of from 30 to 90° C., preferably from 60 to 85° C., and preferably under atmospheric pressure. The pH of the polymerization mixture is from 1 to 4, preferably from 2 to 3. Suitable emulsifiers and the amounts in which they are employed are described in EP-A 492376.

In order to obtain a monomodal particle size distribution, it is preferred to omit a homogenization step during the preparation of the polysiloxane graft base. In a further preferred embodiment, following the conclusion of the polymerization of the graft base, alcohol formed in the said polymerization, and any other volatile constituents, are removed by distillation.

Examples of suitable silanes are, for silanes of the general formula $R_2Si(OR')_2$, dimethyl-diethoxysilane or dimethyldimethoxysilane; for oligomers of the formula $(R_2SiO)$, where n=from 3 to 8, octamethylcyclotetrasiloxane or hexamethylcyclotrisiloxane; for silanes of the general formula $RSi(OR')_3$, methyltrimethoxysilane, phenyltriethoxysilane, 3-chloropropyltrimethoxysilane, 3-mercaptopropyltrimethoxysilane, or methacryloxypropyl-trimethoxysilane; and, for silanes of the general formula $Si(OR')_4$, tetramethoxysilane or tetraethoxysilane.

In the last step of the preparation process the ethylenically unsaturated monomers already mentioned are grafted onto the polysiloxane graft base. Grafting takes place according to the emulsion polymerization process in the presence of water-soluble or monomer-soluble free-radical initiators, by the procedure described in EP-A 492376. With this procedure, the precrosslinked silicone elastomers with an organic-polymer shell are obtained in the form of their aqueous dispersions. It is preferred to establish a solids content of the aqueous dispersions of 10–60% by weight, with particular preference 15–50% by weight.

The degree of crosslinking of the silicone core determines its elastic properties and can be established specifically in a manner familiar to the skilled worker by an appropriate choice of the starting components, corresponding alkoxysilanes and/or siloxanes in order to obtain units $(RSiO_{3/2})$ or $(SiO_{4/2})$. The incorporation of silane units comprising olefinically unsaturated double bonds, for example vinyl radicals or 3-methacryloxypropyl radicals, permits a chemical bonding of the organic-polymer shell to the silicone core through covalent bonds in the subsequent graft polymerization. By choosing suitable monomers for the synthesis of the organic polymer shell b) it is possible to custom-tailor the organic-polymer shells.

For instance, by grafting a copolymer shell comprising, for example, methyl methacrylate (high Tg) and n-butyl acrylate (low Tg) onto a crosslinked silicone core it is possible to establish specifically the softening temperature of the polymer shell and hence to match it precisely to the requirements associated with the processing of the aqueous coating components and the coating properties. By grafting a copolymer shell comprising, for example, methyl methacrylate and glycidyl methacrylate onto a crosslinked silicone core on the one hand it is possible by way of the epoxide functions introduced with glycidyl methacrylate to obtain a matrix attachment between modifier particles and binder resin of the aqueous coating composition, and on the other hand these modifier particles are able to act as crosslinkers in binders based on polyester resin.

The most preference, accordingly, is for crosslinked silicone elastomer particles with a core comprising $(R_2SiO_{2/2})_x(RSiO_{3/2})_y$, where x=80–99 mol % and y=1–20 mol %, where R can be identical or different and has the meaning R=methyl and/or 3-methacryloxypropyl, and with a shell of poly(methyl methacrylate) or copolymer shells comprising methy [sic] methacrylate and butyl acrylate and/or glycidyl methacrylate.

The proportion of the core polymer, based on the overall copolymer weight, is with particular preference 50–80% by weight; accordingly, the proportion of the organic-polymer shell is with particular preference 20–50% by weight. This corresponds to an organic-polymer degree of grafting of 25–100%.

The additive nature of the precrosslinked silicone elastomer particles with an organic-polymer shell and the ease of incorporation as an aqueous dispersion permit use with all common binder systems for aqueous coating materials. Examples of binder systems for aqueous coating materials are, for water-soluble binders, modified alkyd resins, acrylate resins, linear and branched saturated polyester resins, epoxy resins, shellac and modified phenolic resins. Examples of water-dilutable binders are—optionally modified—dispersed or water-dispersible, unsaturated and saturated polyester resins, alkyd resin emulsions, polyurethane dispersions, one-component epoxy resin emulsions, emulsifiable two-component epoxy resin systems, dispersible alkyd, phenolic, melamine and urea resins, (meth) acrylate dispersions, (meth)acrylate copolymer dispersions, polystyrene and styrene copolymer dispersions, poly(vinyl ether) dispersions, and polyvinyl chloride and polyvinylidene chloride dispersions.

For modification, the precrosslinked silicone elastomers with an organic-polymer shell are added preferably in the form of their aqueous dispersions, if desired as dispersion powders, generally in an amount of from 0.5 to 50% by weight, preferably from 1.0 to 3.0% by weight, in each case the silicone elastomer fraction based on the overall weight of silicone elastomer component and binder component, to the aqueous coating formulation. Formulations suitable for aqueous coating materials are known to the skilled worker from, for example, H. Kittel (ed.), Lehrbuch der Lacke und Beschichtungen, Volume IV, Verlag W. A. Colomb, Berlin, Oberschwandorf, 1976.

The addition takes place in accordance with customary procedure for formulating aqueous coating materials, using stirrers or dispersing tools. The aqueous dispersion of the precrosslinked silicone elastomers with an organic-polymer shell can in this case be mixed in any desired order with the components of the aqueous coating formulation, such as binder(s), water, crosslinker, catalyst, pigment, thickener, filler. Mixing (compounding) preferably takes place in a temperature range from +1° C. to +90° C., in particular from +5° C. to +60° C.

The aqueous coating materials modified in accordance with the invention can in principle be employed wherever conventional solvent-based coating materials or non-modified aqueous coating materials are used: They find application in particular for coating the metal of large steel constructions, (e.g. bridges, tanks, cranes and conveying equipment, pipelines, mining and oil extraction equipment, parts of steel works and chemical plants), for coating metal in the automotive sector (clearcoat, topcoat, interior finish, surfacer, stone-chip protection and underbody protection, refinishes for e.g. cars, lorries, buses, building-site and agricultural utility vehicles) and of rail-bound vehicles, freight containers, aircraft, ships (in each case exterior finishes), and also for the coating of metallic substrates prior to their further processing (coil coating), of domestic appliances (e.g. chest freezers, refrigerators, dishwashers, washing machines, electric ovens, etc.) and of metallic packaging (e.g. drums, containers, etc.). They are also used for the coating of furniture (wooden furniture, metal furniture, lamp housings etc.), of architectural components both internal and external (made from wood, steel, non-ferrous metal and nonferrous-metal alloys, plastics, concrete, mortar and plaster, e.g. window frames, exterior panelling, doors, gates, guttering, floors, stairs, facade components, walls, ceilings, heaters and radiators, tanks, lines), of cycles, signs, wheel rims.

The test results in the examples demonstrate that the (impact) toughness of the aqueous coating materials is improved through the addition of precrosslinked silicone elastomer particles with an organic-polymer shell, with no effect on the adhesion of the coating systems and their surface properties and only a slight effect on the hardness of the coating systems. With the comparative examples it is shown that the addition of silicone elastomer particles without an organic-polymer shell, although also improving the (impact) toughness, nevertheless has a markedly adverse effect on the hardness of the coating materials and on their surface properties; consequently, what is required is not only the controlled microphase separation but also good compatibility of the modifier particles with the polymer matrix in the dried coating film.

The reason for the good results in the examples is that owing to the crosslinked silicone phase the impact modifier of the invention is incorporated into the thermoplastic or thermosetting systems in the form of separate, discrete microphases with defined particle size and morphology. Only with complete phase separation is there an absence of the unwanted softening of the polymer matrix, which would result in a loss of or adverse effect on the properties of the polymer matrix such as hardness, dimensional stability and mechanical strength. In addition, the organic-polymer shell produces good compatibility of the particulate modifier with the polymer matrix of the coating binder. It is true that the organic-polymer shell is not absolutely necessary for the miscibility/colloidal compatibility of the pre-crosslinked silicone elastomer particles in dispersion form with water-soluble or water-dilutable binders; however, it is so for the polymer compatibility of the particles with the matrix after drying. The particle structure and the polymer compatibility of the particles provide a precise definition of the domain sizes of the modifier phase by way of the particle diameter. Contamination problems, adhesion problems, sedimentation problems and flow defects do not occur, since the pre-crosslinked silicone elastomer particles are grafted completely with an organic-polymer shell. The resulting coatings are overcoatable.

The examples which follow serve to illustrate the invention:

EXAMPLE 1–2

Comparative Examples 1–3

In Examples 1 and 2 and in Comparative Examples 1 to 3, polyester coating formulations were prepared having the compositions specified in Table 1. In the examples in accordance with the invention, dispersion A was employed. In Comparative Examples 2 and 3, dispersion B was employed. The coating formulation of Comparative Example 1 corresponds to that of conventional, unmodified aqueous coating materials.

Dispersion A

Aqueous dispersion of silicone particles with a core comprising $[R_2SiO_{2/2}]_x$ $[R'\ SiO_{3/2}]_y$ (x=95 mol-%, y=5 mol-%; R=methyl, R'=methyl and 3-methacryloxypropyl) and a polymethyl methacrylate shell (PMMA degree of grafting 50% by weight); the primary particle size is about 100 nm, the solids content of silicone particles with -an organic-polymer shell is 26.3%.

Dispersion B

Aqueous dispersion of silicone particles, composed of $[R_2SiO_{2/2}]_x$ $[RSiO_{3/2}]_y$ (x=95 mol-%, y=5 mol-%; R=methyl); the primary particle size is about 100 nm, the solids content of silicone particles is 19%.

To prepare the aqueous coating formulations (Examples 1–2, Comparative Examples 1–3) listed in Table 1, the components specified therein were mixed together at ambient temperature for 20 to 30 minutes by means of a dissolver.

For testing, the aqueous coating formulations were applied to metal panels by means of a spiral film-drawing doctor blade. Drying took place at ambient temperature (22° C.), and the tests were carried out 3 days after panel application. The test results are compiled in Table 1.

The following test methods were employed:

Surface Nature

The surface nature was evaluated qualitatively by visual assessment of the film surface.

Overcoatability

To assess the overcoatability, the metal panels coated with the coating formulations of Example 1–2 and Comparative Example 1–3 were overcoated again with in each case the identical coating formulation. The overcoatability was evaluated qualitatively by visual observation.

Intercoat Adhesion After Overcoating

To determine the intercoat adhesion an examination was made, after a drying a period of 3 days, of whether the upper coating film can be partially removed by peeling with a penknife. The intercoat adhesion was evaluated as "good" when no removal whatsoever could be found.

Reverse Impact

The reverse impact was determined by ball impact testing with the ERICHSEN ball impact tester type 304.

König Pendulum Hardness

The König pendulum hardness was tested in accordance with DIN 53137.

Erichsen Indentation

The Erichsen indentation was tested in accordance with DIN ISO 1520.

Cross-hatch

The cross-hatch was determined by the method of DIN 53151.

The results show that the (impact) toughness (reverse impact) is markedly improved by adding the silicone elastomer particles according to the invention with a PMMA shell (Examples 1 and 2), with only a slight reduction in film hardness and with no adverse effect on adhesion and surface properties of the films. Although when using silicone elastomer particles without an organic-polymer shell (Comparative Examples 2 and 3) the (impact) toughness is improved to a comparable extent, film hardness, surface properties and adhesion after overcoating are effected in a markedly adverse manner.

TABLE 1

|  | Example 1 | Example 2 | Comparative Example 1 | Comparative Example 2 | Comparative Example 3 |
|---|---|---|---|---|---|
| Components [parts by wt.] | | | | | |
| 1. Halwedrol O x 47-2/40 W[a)] (40% in H$_2$O) | 50.0 | 50.0 | 50.0 | 50.0 | 50.0 |
| 2. Kronos TiO$_2$-2130[b)] | 25.0 | 25.0 | 25.0 | 25.0 | 25.0 |
| 3. Dispersion A | 12.5 | 23.0 | — | — | — |
| 4. Dispersion B | — | — | — | 12.5 | 23.0 |
| 5. Reolate 255[c)] | 0.5 | 0.5 | 0.5 | 0.5 | 0.5 |
| Proportion of silicone elastomer particles with PMMA shell based on binder (solids/solids) in % | 16 | 30 | — | — | — |
| Proportion of silicone elastomer | — | — | — | 12 | 22 |

TABLE 1-continued

|  | Example 1 | Example 2 | Comparative Example 1 | Comparative Example 2 | Comparative Example 3 |
|---|---|---|---|---|---|
| particles based on binder (solids/solids) in % |  |  |  |  |  |
| Silicone component based on binder (solid/solid) | 11 | 20 | — | 12 | 22 |
| Dry film thickness in μm | 26 | 26 | 28 | 32 | 31 |
| Mechanical values |  |  |  |  |  |
| Reverse impact (in × lbs) | 40 | 60 | 12 | 46 | 60 |
| König pendulum hardness | 56 | 54 | 67 | 46 | 42 |
| Erichsen indentation (mm, steel panel) | >6 | >6 | >6 | >6 | >6 |
| Cross-hatch | Gt 0 | Gt 0 | Gt 0 | Gt 0 | Gt 0 |
| Surface | smooth | smooth | smooth | rough | rough |
| Overcoatability | yes | yes | yes | yes | yes |
| Intercoat adhesion after overcoating | good | good | good | moderate | moderate | a)Fatty-acid-modified polyester resin from Hüttenes-Albertus Lackrohstoffe
b)TiO$_2$ pigment from Kronos-Titan
c)Polyacrylate-based thickener from Kronos-Titan EXAMPLES 3 and 4

Comparative Example 4

The procedure was similar to that for Examples 1–2 and Comparative Examples 1–3 with the difference that aqueous coating materials based on a two-component epoxy resin coating material were tested. In the Examples 3 and 4 in accordance with the invention, dispersion A was again employed for modification. The coating formulation of Comparative Example 4 was not modified.

To prepare the aqueous coating formulations listed in Table 2 (Examples 3–4, Comparative Example 4) the components specified therein were mixed together at ambient temperature for 20 to 30 minutes by means of a dissolver. The aqueous coating formulations were applied to aluminium panels and to metal panels by means of a spiral film-drawing doctor blade. Drying took place at ambient temperature (22° C.). The tests were carried out 3 days after panel application, in a manner similar to the abovementioned test specifications. The test results are compiled in Table 2.

The results show, that the (impact) toughness (reverse impact) is markedly improved by adding the silicone elastomer particles according to the invention with a PMMA shell (Examples 3 and 4), with only a slight reduction in film hardness.

TABLE 2

|  | Example 3 | Example 4 | Comparative Example 4 |
|---|---|---|---|
| Components [parts by wt.] |  |  |  |
| 1. Epires ER 8 | (100%)a) | 43.5 | 43.5 43.5 |
| 2. Borchigol VL 73 Sb) | 0.2 | 0.2 | 0.2 |
| 3. Kronos TiO$_2$ - 2160c) | 45.0 | 45.0 | 45.0 |
| 4. Dispersion A | 15.25 | 30.50 | — |
| 5. Blanc Fix Microd) | 10.0 | 10.0 | 10.0 |
| 6. Demineralized water | about 20 | about 20 | about 20 |
| 7. Epilink DP 700 (55% in H2O [sic])e) | 66.7 | 66.7 | 66.7 |
| Proportion of silicone elastomer particles with PMMA shell based on binder (solids/solids) | 5.0 | 10.0 | — |
| in % |  |  |  |
| Dry film thickness in μm (metal panel) | 24 | 26 | 33 |
| Dry film thickness in μm (aluminium panel) | 23 | 24 | 33 |
| Mechanical values |  |  |  |
| Reverse impact (in × lbs) (metal panel) | 66 | >80 | 4 |
| Reverse impact (in × lbs) (aluminum panel) | 40 | 46 | 4 |
| König pendulum hardness (metal panel) | 89 | 89 | 118 |
| König pendulum hardness (aluminium panel) | 88 | 83 | 108 | a)Two-component epoxy resin coating material based on bisphenol A/F from Air Products
b)Leveling agent based on fatty acid esters, from Borchers
c)TiO$_2$ pigment from Kronos-Titan
d)Barium sulphate-based filler from Sachtleben
e)Polyamine adduct hardener from Air Products

What is claimed is:

1. A process of formulating an aqueous coating composition based on water-soluble or water-dilutable binders, said process comprising adding binder and precrosslinked silicone elastomer copolymer particles with an organic-polymer shell to water, the silicone elastomer particles comprising:

a) from about 5 to about 95% by weight, based on the overall weight of the copolymer, of a core polymer of the general formula $(R_2SiO_{2/2})_x \cdot (RSiO_{3/2})_y \cdot (SiO_{4/2})_z$ where x=from about 5 to about 99.5 mol %, y=from about 0.5 to about 95 mol %, z=from 0 to about 30 mol %, and b) from about 5 to about 95% by weight, based on the overall weight of the copolymer, of a shell of an organic polymer of mono- or poly-ethylenically unsaturated monomers, and R denotes identical or different monovalent alkyl or alkenyl radicals having 1 to 6 carbon atoms, aryl radicals or substituted hydrocarbon radicals.

2. The process according to claim 1, in which the precrosslinked silicone elastomer particles with an organic-polymer shell are dispersed in the water to form an aqueous dispersion having a solids content of about 10 to about 60% by weight.

3. An aqueous coating composition based on water-soluble or water-dilutable binders, said composition comprising precrosslinked silicone elastomer particles with an organic-polymer shell, where the silicone elastomer copolymer particles comprise a) from about 5 to about 95% by weight, based on the overall weight of the copolymer, of a core polymer of the general formula $(R_2SiO_{2/2})_x \cdot (RSiO_{3/2})_y \cdot (SiO_{4/2})_z$ where x=from about 5 to about 99.5 mol %, y=from about 0.5 to about 95 mol %, z=from 0 to about 30 mol %, and b) from about 5 to about 95% by weight, based on the overall weight of the copolymer, of a shell of an organic polymer of mono- or poly-ethylenically unsaturated monomers, and R denotes identical or different monovalent alkyl or alkenyl radicals having 1 to 6 carbon atoms, aryl radicals or substituted hydrocarbon radicals.

4. An aqueous coating composition according to claim 3, in which the precrosslinked silicone elastomer copolymer particles with an organic-polymer shell comprise a) from about 20 to about 80% by weight, based on the overall weight of the copolymer, of a core polymer $(R_2SiO_{2/2})_x \cdot (RSiO_{3/2})_y \cdot (SiO_{4/2})_z$ where x=from about 50 to about 99 mol %, y=from about 1 to about 50 mol %, z=from 0 to about 20 mol %; and b) from about 20 to about 80% by weight, based on the overall weight of the copolymer, of a shell of an organic polymer of mono- or polyethylenically unsaturated monomers, with R being as defined in claim 3.

5. An aqueous coating composition according to claim 4, in which the precrosslinked silicone elastomer particles comprise a core of $(R_2SiO_{2/2})_x \cdot (R_2SiO_{3/2})_y$ where x=about 80 to about 99 mol % and y=about 1 to about 20 mol %, where R can be identical or different and denotes methyl and/or 3-methacryloxypropyl, and a shell of poly(methyl methacrylate) or copolymer shells of methyl methacrylate and butyl acrylate and/or glycidyl methacrylate.

6. An aqueous coating composition according to claim 5, in which the precrosslinked silicone elastomer particles with an organic-polymer shell have an average particle diameter of from about 10 to about 300 nm.

7. An aqueous coating composition according to claim 6, in which the precrosslinked silicone elastomer particles with an organic-polymer shell have a monomodal particle size distribution with a polydispersity index of not more than $\sigma_2$=about 0.2.

8. An aqueous coating composition according to claim 7, in which the precrosslinked silicone elastomer particles with an organic-polymer shell are employed in an amount of from about 0.5 to about 50% by weight, based on the overall weight of silicone elastomer component and binder component, in the aqueous coating composition.

9. An aqueous coating composition according to claim 7, in which the aqueous coating composition further comprises water, crosslinker, catalyst, pigment, thickener and filler.

10. An aqueous coating composition according to claim 8, in which the binders comprise water-soluble binders which are selected from the group consisting of modified alkyd resins, acrylate resins, linear and branched saturated polyester resins, epoxy resins, shellac and modified phenolic resins or water-dilutable binders which are selected from the group consisting of unsaturated and saturated polyester resins, alkyd resin emulsions, polyurethane dispersions, one-component epoxy resin emulsions, emulsifiable two-component epoxy resin systems, dispersible alkyd, phenolic, melamine and urea resins, (meth)acrylate dispersions, (meth)acrylate copolymer dispersions, polystyrene and styrene copolymer dispersions, poly(vinyl ether) dispersions, and polyvinyl chloride and polyvinylidene chloride dispersions.

* * * * *